United States Patent [19]
Hoover

[11] Patent Number: 5,808,658
[45] Date of Patent: Sep. 15, 1998

[54] REGULATOR WITH PHASE SHIFT FOR POLYGON REPHASE WITHOUT DIVIDE

[75] Inventor: Martin E. Hoover, Rochester, N.Y.

[73] Assignee: Xerox Corporation, Stamford, Conn.

[21] Appl. No.: 829,269

[22] Filed: Mar. 31, 1997

[51] Int. Cl.[6] ..................................................... B41J 2/47
[52] U.S. Cl. ......................................... 347/250; 347/248
[58] Field of Search ................................... 347/250, 235, 347/248, 234

[56] References Cited

U.S. PATENT DOCUMENTS

| | | | |
|---|---|---|---|
| 4,663,523 | 5/1987 | Swanberg | 358/481 |
| 4,975,626 | 12/1990 | Yagi et al. | 347/250 |
| 5,208,796 | 5/1993 | Wong et al. | 367/97 |
| 5,381,165 | 1/1995 | Lofthus et al. | 346/108 |
| 5,640,426 | 6/1997 | Ishizu | 375/326 |

Primary Examiner—Mark J. Reinhart
Attorney, Agent, or Firm—Ronald F. Chapuran

[57] ABSTRACT

An imaging system for forming multiple superimposed image exposure frames on a photoconductive member moving in a process direction including a rotating polygon having a plurality of facets. A raster output scanner forms a plurality of scanlines in a transverse direction across the photoconductive member by reflecting modulated beams from the rotating polygon. A method of providing scanning speed and phase shift control by providing a signal representing image exposure frame registration and a start of scan (SOS) signal representing the beginning of a scanline. The relative phase between the start of scan signal and the signal representing image exposure frame registration is determined and converted into a digital signal along with a speed determination signal by use of a fast clock timer. The digital signals are summed and inverted in polarity in order to change the speed of the rotating polygon to synchronize the signal representing image exposure frame registration with the SOS signal.

12 Claims, 2 Drawing Sheets

REGULATOR WITH PHASE SHIFT FOR POLYGON REPHASE WITHOUT DIVIDE

BACKGROUND AND MATERIAL DISCLOSURE STATEMENT

This invention relates generally to a raster output scanning system for producing a high intensity imaging beam which scans across a rotating polygon to a movable photoconductive member to record electrostatic latent images thereon, and, more particularly, to a combination polygon speed and rephase correction for image registration.

In recent years, laser printers have been increasingly utilized to produce output copies from input video data representing original image information. The printer typically uses a Raster Output Scanner (ROS) to expose the charged portions of the photoconductive member to record an electrostatic latent image thereon. Generally, a ROS has a laser for generating a collimated beam of monochromatic radiation. The laser beam is modulated in conformance with the image information. The modulated beam is reflected through a lens onto a scanning element, typically a rotating polygon having mirrored facets.

The light beam is reflected from a facet and thereafter focused to a "spot" on the photosensitive member. The rotation of the polygon causes the spot to scan across the photoconductive member in a fast scan (i.e., line scan) direction. Meanwhile, the photoconductive member is advanced relatively more slowly than the rate of the fast scan in a slow scan (process) direction which is orthogonal to the fast scan direction. In this way, the beam scans the recording medium in a raster scanning pattern. The light beam is intensity-modulated in accordance with an input image serial data stream at a rate such that individual picture elements ("pixels") of the image represented by the data stream are exposed on the photosensitive medium to form a latent image, which is then transferred to an appropriate image receiving medium such as paper. Laser printers may operate in either a single pass or multiple pass system.

In a multiple pass system, each image area on the photoreceptor surface must make at least three revolutions (passes) relative to the transverse scanline formed by the modulated laser beam generated by a ROS system. Each image must be registered to within a 0.1 mm circle or within a tolerance of ±0.05 mm. Each color image must be registered in both the photoreceptor process direction (skew registration) and in the direction perpendicular to the process direction (referred to as fast scan or transverse registration).

Various techniques for multiple image registration are known in the prior art. For example, U.S. Pat. No. 5,208,796 discloses a technique wherein targets on a photoconductor belt are used for the detection of lateral belt displacement to control the transverse location of exposure scan.

In a color printer the alignment of the lead edge of the color image is made difficult if a Raster Output Scanner (ROS) is used to expose the photoreceptor (PR). Typically as the PR travels into the position where the first scanline is to be imaged, it is sensed by a hole sensor detecting a hole in the belt. It is desired to image the first immediately when this occurs and to repeat this for all four colors to achieve perfect lead edge color registration. However, because of the scanning nature of the ROS imager, the ROS spot, more than likely will not be at the SOS (start of scan) position as the PR hole arrives at the hole sensor. If this is the case, the system must wait until the next scanline crosses the SOS sensor to begin imaging. During this delay, the PR will have traveled and the first scan will be misregistered by a maximum of one full pixel or for a 600 spi ROS, over 40 microns.

A typical prior art registration technique is disclosed in U.S. Pat. No. 5,381,165 showing registration by a feedback loop in which the phase and frequency of SOS signals and a reference signal are compared to produce an error signal representing frequency differences between rotating polygons associated with each Raster Output Scanner in a system of multiple raster output scanners.

The prior art, however, does not teach a relatively simple adjustment both for out of phase conditions of scanner and SOS signals relative to a hole sensor as well as for speed control of the rotating polygon. Prior art techniques often need various instructions and calculations requiring higher cost microcontroller hardware. For example, in the prior art, a motor control loop using period feedback often is a non-linear control in that feedback is inversely proportional to the controlled output (period is a 1/x relationship to motor speed). This inverse proportional non-linearity is usually linearized by converting the measured period into a frequency by using a divide calculation. If the approximation is made that for a narrow band of speed regulation the period is approximately linear, the observation is made that the feedback merely has the wrong sign, that is, when the motor speed up the period gets smaller and when the motor slows down the period gets larger. This would normally lead to a totally unstable control because of positive feedback.

It would be desirable, therefore, to provide a relatively simple yet reliable speed and phase shift control. In particular, it would be desirable to be able to change the sign of the error subtraction junction such that the error is calculated by subtracting the reference from the feedback rather than the common method of subtracting the feedback from the reference. The net result is that with the same realtime calculation as normally used, the calculated error now has the correct sign for the closed loop.

It is an object of the present invention, therefore, to provide a relatively simple and reliable adjustment for out of phase conditions of scanner and SOS signals as well as for speed control of the rotating polygon. It is another object of the present invention to eliminate the need for divide calculation instructions and to enable a lower cost speed and phasing microcontroller. Other advantages of the present invention will become apparent as the following description proceeds, and the features characterizing the invention will be pointed out with particularity in the claims annexed to and forming a part of this specification.

SUMMARY OF THE INVENTION

There is disclosed an imaging system for forming multiple superimposed image exposure frames on a photoconductive member moving in a process direction including a rotating polygon having a plurality of facets. A raster output scanner forms a plurality of scanlines in a transverse direction across the photoconductive member by reflecting modulated beams from the rotating polygon. A method is shown of providing scanning speed and phase shift control by providing a signal representing image exposure frame registration and a start of scan (SOS) signal representing the beginning of a scanline. The relative phase between the start of scan signal and the signal representing image exposure frame registration is determined and converted into a digital signal along with a speed determination signal by use of a fast clock timer. The digital signals are summed and inverted in polarity in order to change the speed of the rotating polygon to synchronize the signal representing image exposure frame registration with the SOS signal.

For a better understanding of the present invention, reference may be had to the accompanying drawings wherein the same reference numerals have been applied to like parts and wherein:

DESCRIPTION OF THE INVENTION

Figure 1:
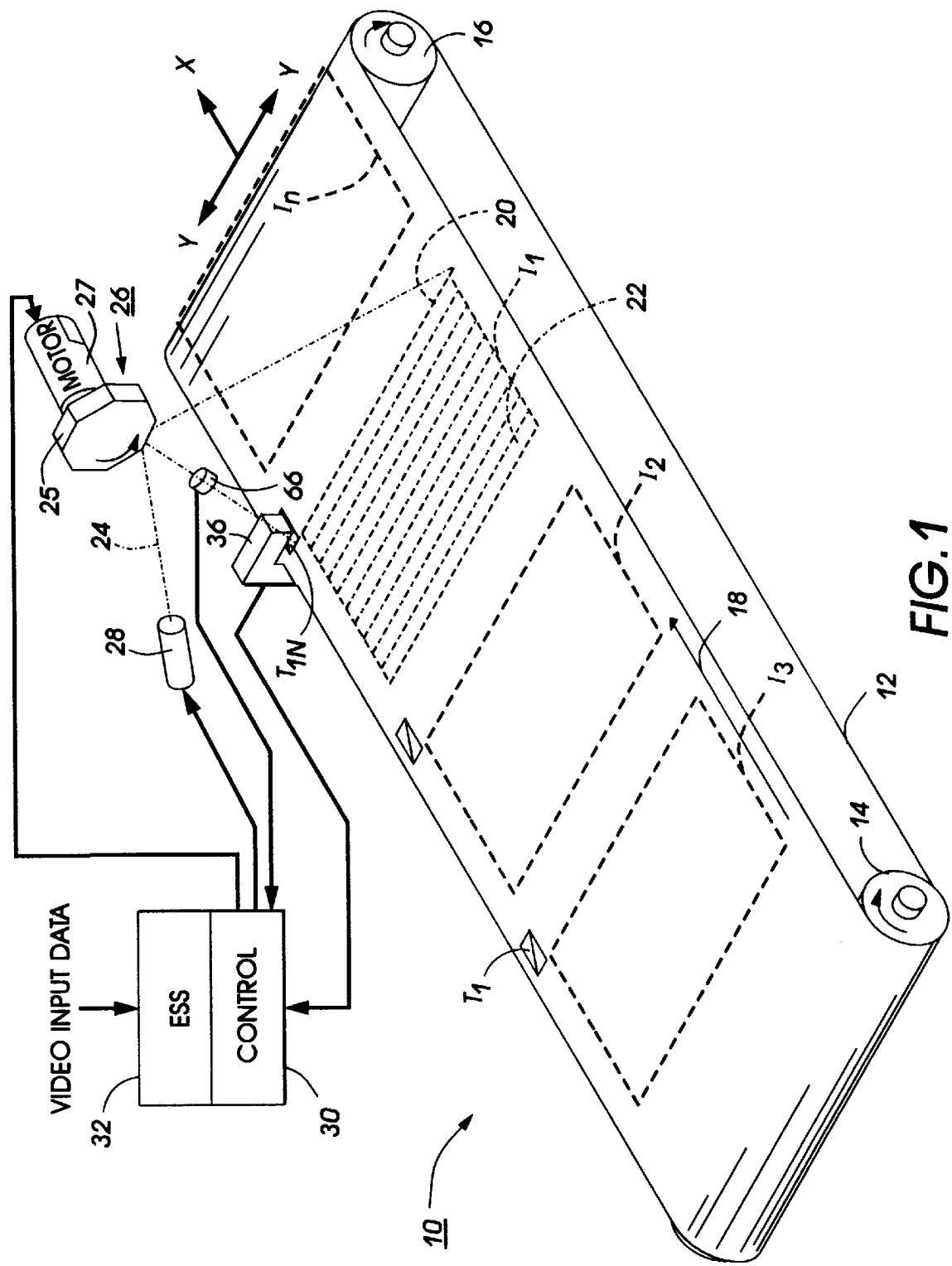
FIG. 1 shows a typical multi-pass ROS color printing system incorporating the present invention.

In FIG. 1 of the drawings, an embodiment of the present invention is incorporated in a multi-pass xerographic printing system depicted schematically and designated generally by reference numeral 10. The system 10 includes a photoreceptive belt entrained about guide rollers 14 and 16, at least one of which is driven to advance the belt 12 in a longitudinal direction of processing travel depicted by the arrow 18. The length of the belt 12 is designed to accept an integral number of spaced image areas $I_1–I_n$ represented by dashed line rectangles in FIG. 1. As each of the image areas $I_1–I_n$ reaches a transverse line of scan, represented by a dashed arrow 20, it is progressively exposed on closely spaced transverse raster lines 22 shown with exaggerated longitudinal spacing on the image area $I_1$ in FIG. 1.

In the embodiment depicted in FIG. 1, the line 20 is scanned by a raster output scanner so that a modulated laser beam 24 is reflected to the line 20 by successive facets 25 on a rotatable polygon-shaped mirror 26. The beam 24 is emitted by a laser device 28 such as a laser diode, operated by a laser drive module forming part of a control processor generally designated by the reference numeral 30. The processor 30 includes other not shown circuit or logic modules such as a scanner drive command circuit, by which operation of motor 27 for rotating the polygon mirror 26 is controlled. A start of scan (SOS) sensor, shown at 66, determines a start of scan reference point and also provides suitable feedback signals to control 30.

In the operation of the system 10, as thus far described, the control 30 responds to a video signal to expose each raster line 22 to a linear segment of the video signal image. In xerographic color systems, each image area $I_1–I_n$, must be exposed in the same manner to four successive exposures, one for each of the three basic colors and black. In a multi-pass system such as the system 10, where only one raster output scanner or head is used, complete exposure of each image area requires four revolutions of the belt 12.

The image areas $I_1–I_n$ are successively exposed on successive raster lines 22 as each raster line registers with a transverse scanline 20 as a result of longitudinal movement of the belt 12.

It is to be noted that the length of the transverse scanline 20 in system 10 is longer than the transverse dimension of the image areas I. Scanline length, in this respect, is determined by the length of each mirror facet 25 and exceeds the length of the raster lines 22. The length of each raster line is determined by the time during which the laser diode is active to reflect a modulated beam from each facet 25 on the rotating polygon 26 as determined by the laser drive module. Thus, the active portion of each transverse scanline may be shifted in a transverse direction by control of the laser drive module and the transverse position of the exposed raster lines 22, and image areas $I_1–I_n$, shifted in relation to the belt 12.

Adjustment of the active portion of the transverse scanline 20 for each succeeding image is needed to assure precise longitudinal alignment or transverse registration of the succeeding images with the first image irrespective of the lateral position of the belt during exposure of the images. This operation is achieved in substantial measure by the provision of targets aligned in the direction of belt travel and of a design to facilitate generation of a signal corresponding to the location of each target. In particular and in the multi-pass system of FIG. 1, targets $T_1–T_n$ are located along a marginal edge of the belt 12 to be aligned in a longitudinal direction and are spaced to be located slightly ahead of each image areas $I_1–I_n$ or upstream from each such area in the context of belt travel. A single sensor 36 is located to be aligned with targets T1–Tn for the image area passing the transverse scanline 20 in FIG. 1.

Downstream from the exposure station, a development station (not shown) develops the latent image formed in the preceding image area. After the last color exposure, a fully developed color image is then transferred to an output sheet. An electronic Sub System (ESS) 32 contains the circuit and logic modules which respond to input video data signals and other control and timing signals, to drive the photoreceptor belt 17 synchronously with the image exposure and to control the rotation of the polygon by the motor. For further details, reference is made to U.S. Pat. Nos. 5,381,165 and 5,208,796 incorporated herein.

As illustrated any suitable marker on the photoconductive surface or belt or any suitable hole, such as targets T1 . . . TN, provides a reference for each projected image on the belt surface. In other words, the detection by sensor of a mark or hole in the photoconductive surface establishes the first scanline of the projected image and in a multi pass image on image system, helps to establish image on image registration. In addition, the start of scan signals indicate the scanning laser beam to be at a start of scan position with reference to the photoconductive surface.

Generally, in the prior art, with a polygon of eight facets, the detected start of scan signal for each of eight facets on a polygon are used to inject a phase shift into the polygon motor. In particular, a polygon controller monitors the SOS signals from each of the facets, as the polygon rotates, to either speed up or slow down the rotating polygon to maintain uniform rotation. Thus there is a closed loop control from the SOS detector to maintain a uniform speed of rotation of the polygon. It is well known that the individual facets to a polygon, because of fabrication tolerances, are not all similar. The facets are different in degree of flatness or off center, and there is a non uniformity of the scanning beam reflected on to the photoconductive belt due to this non uniformity.

Figure 2:
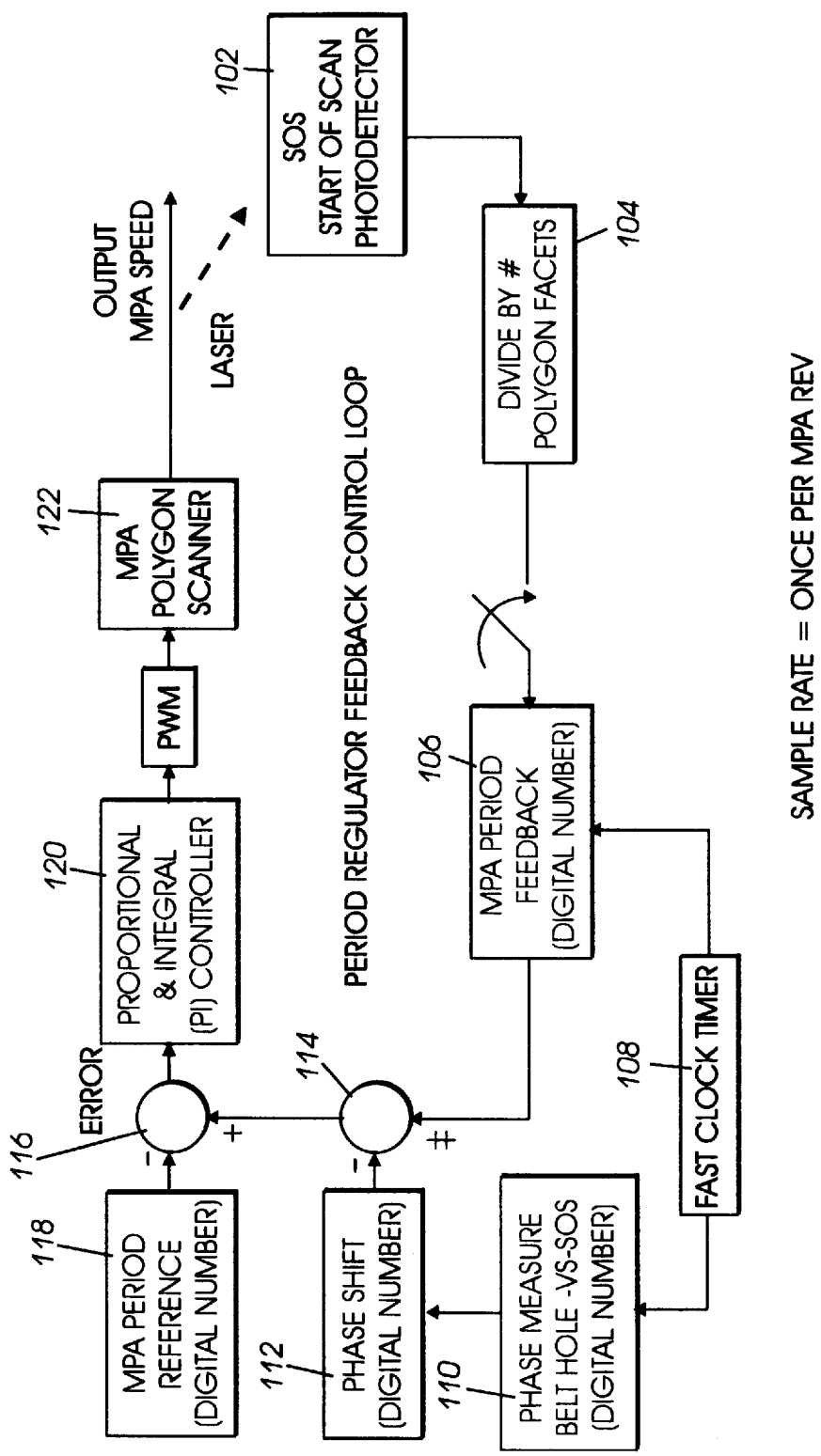
FIG. 2 illustrates a block diagram of speed and rephase control in accordance with the present invention.

In accordance with the present invention, reference is made to FIG. 2. The motor speed control utilizes period feedback as measured from Start Of Scan (SOS) signals divided down by the number of facets on the polygon to measure a time period once per revolution of the polygon assembly. This improves period feedback resolution by measuring a larger period with respect to the fast clock used to measure the period.

The polygon assembly revolution time period is sampled and fedback at exactly the measurement time and rate of the polygon assembly once per revolution such that the polygon assembly PERIOD REFERENCE represents the desired period in fast clock counts and the polygon assembly PERIOD FEEDBACK represents the actual measured period once per revolution period in fast clock counts. Note the change in sign of the error subtraction to correct for the period feedback wrong sign. The benefit is that the numbers used within the control loop are purely time periods in fast clock counts such that if a number of counts were injected into the control loop the polygon assembly will advance or retard and shift relative to its previous position. The phase shift is then represented very simply by time periods in fast clock counts.

This implementation directly extends to polygon rephasing without requiring mathematical manipulation of the measured rephase error and then converting it into a number representing a fraction of a scan that would also require divide calculation capability from the microcontroller. The direct injection of shift allows a phase error measure of SOS with respect to the marker on the belt (belt hole) and then injection of this measure directly into the motor control loop to rephase the motor by the amount of rephase error measured.

Previous implementations of this functional capability were implemented with higher cost microcontrollers that did have divide math capability. This control method enables utilization of lower cost microcontrollers that are also shared between dual beam laser power control and motor control providing a significant cost savings.

With reference to FIG. 2, a motor polygon assembly (MPA) is shown at 122 providing a laser beam output at a given speed. A portion of the laser speed illustrated by the dotted arrow is sensed at 102 to provides SOS signals. The SOS signals are divided by the number of polygon facets shown at 104. An MPA period feedback signal is provided at 106. It is a digital number that is provided at a sample rate at once per polygon revolution. The fast clock timer 108 provides the fast clock pulses to digitize the period feedback signal and to digitize a phase signal representing the phase difference between the detection of an SOS signal and the detection of a belt hole signal shown at 110. A phase shift digital number provided at 112 and summing junction 114 responds to both a phase shift number from 112 and an MPA period feedback number to provide a combined signal to summing function 116. Summing junction 116 according to the present invention, subtracts an MPA reference number, shown at 118, from the feedback signal provided from summing junction 114. Normally, the feedback signal is subtracted from the reference. The net result is that the error calculated has the correct sign or polarity for the closed loop. The error signal from summing function 116 is provided to controller 120 in turn controlling the motor polygon assembly 122.

While the invention has been described with reference to the structure disclosed, it will be appreciated that numerous changes and modifications are likely to occur to those skilled in the art, and it is intended to cover all changes and modifications which fall within the true spirit and scope of the invention.

What is claimed is:

1. An imaging system for forming multiple superimposed image exposure frames on a photoconductive member moving in a process direction including:

a raster output scanner forming a plurality of scanlines in a transverse direction across the width of said member by reflecting modulated beams from a plurality of facets of a rotating polygon, a photoconductive member indicator for registering images on the photoconductive member, means for detecting the beginning of a scanline and providing a start of scan (SOS) signal representing the detection, means to detect the relative phase between the lead edge of the start of scan signals and the detection of said indicator including a fast clock timer to provide a phase shift digital count, and means to change the speed of the rotating polygon to synchronize the phase of said indicator with the lead edge of said SOS signals.

2. The system of claim 1 wherein the means to change the speed of the rotating polygon includes a sign inversion summing junction.

3. System of claim 1 wherein the means to change the speed of the rotating polygon includes a speed adjustment based upon periods between polygon facets.

4. The system of claim 3 wherein the periods between polygon facets is determined by the fast clock timer.

5. The system of claim 1 wherein the means to change the speed of the rotating polygon includes a summing junction responding to a period feedback digital signal and a phase shift digital signal.

6. The system of claim 2 wherein the sign inversion summing junction responds to a digital signal representing a speed feed back signal and a phase shift signal.

7. The system of claim 6 wherein the sign inversion summing junction responds to a digital signal representing a period reference.

8. In an imaging system for forming multiple superimposed image exposure frames on a photoconductive member moving in a process direction, a method of providing scanning speed and phase shift control comprising the steps of:

forming a plurality of scanlines in a transverse direction across the width of said member by reflecting modulated beams from a plurality of facets of a rotating polygon, sensing scanning speed, providing a signal representing image exposure frame registration, detecting the beginning of a scanline and providing a start of scan (SOS) signal representing the detection, determining the relative phase between the start of scan signal and the signal representing image exposure frame registration, converting scanning speed and relative phase into digital signals, summing the digital signals and inverting the polarity in order to change the speed of the rotating polygon to synchronize the signal representing image exposure frame registration with the SOS signal.

9. The method of claim 8 including a fast clock timer to provide phase shift and scanning speed digital counts.

10. The method of claim 8 wherein the means to change the speed of the rotating polygon includes a sign inversion summing junction.

11. The method of claim 1 the step of changing the speed of the rotating polygon includes the step of adjusting speed based upon periods between polygon facets.

12. The method of claim 11 wherein the step of changing the speed of the rotating polygon includes the step of a summing junction responding to a period feedback digital signal and a phase shift digital signal.

\* \* \* \* \*

UNITED STATES PATENT AND TRADEMARK OFFICE
CERTIFICATE OF CORRECTION

PATENT NO : 5,808,658
DATED : September 15, 1998
INVENTOR(S) : Chih-Hsiung WU

It is certified that error appears in the above-identified patent and that said Letters Patent are hereby corrected as shown below:

On the title page,
add the foreign application priority data as follows:

--[30]  Foreign Application Priority Data

Feb. 27, 1997 [TW] Taiwan..........86203169--

Signed and Sealed this

Fourteenth Day of December, 1999

Attest:

Q. TODD DICKINSON

*Attesting Officer*         *Acting Commissioner of Patents and Trademarks*